(12) United States Patent
Lin

(10) Patent No.: US 6,999,010 B2
(45) Date of Patent: Feb. 14, 2006

(54) TABLE LOOK-UP METHOD FOR ABSTRACT SYNTAX NOTATION ENCODING/DECODING SYSTEM

(75) Inventor: Tai-Hung Lin, Taipei (TW)

(73) Assignee: Ares International Corporaton, Taiepi (TW)

(*) Notice: Subject to any disclaimer, the term of this patent is extended or adjusted under 35 U.S.C. 154(b) by 90 days.

(21) Appl. No.: 10/825,129

(22) Filed: Apr. 16, 2004

(65) Prior Publication Data

US 2005/0231400 A1 Oct. 20, 2005

(51) Int. Cl.
*H03M 7/00* (2006.01)

(52) U.S. Cl. ...................... 341/106; 341/107

(58) Field of Classification Search ............ None
See application file for complete search history.

(56) References Cited

U.S. PATENT DOCUMENTS 5,379,345 A * 1/1995 Greenberg ............ 455/2.01

6,493,384 B1 * 12/2002 Mihara .............. 375/240.02

* cited by examiner

*Primary Examiner*—Peguy Jeanpierre
*Assistant Examiner*—Joseph Lauture

(57) ABSTRACT

A table look-up method for ASN.1 encoding/decoding systems is disclosed. Once the invention receives input data, it adds a specified index to the received data, then it analyzes whether the received data contains explicit reference data, implicit reference data or optional data. The invention further modifies the specified index of explicit, implicit or optional data. It compares the consistency of the modified specified index with the specified index in a reference table; if it is consistent, it declares the input data being fully decoded. The conventional method has four main steps: (1). Updating definition data. (2). Executing program generator. (3). Redoing encoding and decoding. (4). Applying new function. This invention simplifies the method into two main steps: (1). Updating definition data. (2). Applying new function. Furthermore, this method does not need to modify program for encoding/decoding a file. This method simplifies the conventional flow process for handling the tabulated data file.

10 Claims, 5 Drawing Sheets

TABLE LOOK-UP METHOD FOR ABSTRACT SYNTAX NOTATION ENCODING/DECODING SYSTEM

BACKGROUND OF THE INVENTION

This invention relates to a method for Abstract Syntax Notation One (ASN.1) encoding/decoding systems. This invention can directly process a new format data in an input file for encoding or decoding ANS.1 data. The original encoding/decoding program does not need to be updated.

Due to wide uses of computers, quick growth of Internet and many new technologies on the World Wide Web (WWW), Internet becomes the largest media for information exchanging and commercial marketing. It also causes the emerging of e-business that utilizes computers and Internet technologies to automatically conduct commercial transactions. It can be viewed as an extension of electronic data interchange (EDT) and value added networks. ED is referred to data exchange between companies for their business or trading. These data can trigger a sequence of processes in various information systems manufacture systems or business systems of various companies. In other words an application in a computer sends data to another application system in another computer via pre-agreed protocol standards and data formats through electronic media. Furthermore, a computer can automatically "understand", "process" and "reply" this data so that a company can increase efficiency, productivity and reduce costs to improve its profits and competitiveness.

One of the existing data format standard used for EDI network management is Abstract Syntax Notation One (ASN.1). The purpose of ASN.1 is to provide an uniformed syntax structure for computer languages among different machines. ASN.1 defines a set of standard methods to describe data structure for various types of in formation so that information can be presented in the same way. Corresponding to ASN.1, there is a set of data encoding rule called Basic Encoding Rule (BER), which is a specified encoding scheme in order to interchange the ASN.1 data structure between computer networks. BER has two parts: part one describes data contents, date types and sequence formats; another part describes how to assemble different pieces of data into a message. ASN.1 encoding/decoding method has been widely used in many areas, such as, encrypted data delivery, electronic identification, communication data exchanges, etc. Since Internet already became very popular, the need for data security has increased. The information that is encoded in ASN.1 format also becomes very popular. However, it is very cumbersome to modify the ASN.1 encoding/decoding computer programs designed for a particular ASN.1 data format to process other ASN.1 data formats. Thus, another type of data structure exchange tool called "XML" has been created. XML does not allow changing data structures, thus the encoding/decoding program becomes simple and easy. However, the trade of simplify a convenience of programming, it also creates other inconvenience. Comparing with ASN.1, XML has the following shortcomings: (1). Too much overhead for data interchanged: for the same information that XML will send five times more data than ASN.1 does. (2). Encryption agreement not yet finalized: XML has more chances to be intruded and damaged than ASN.1 does. Thus, XML requires more dedicated planning for security. (3). Spend too much time for transforming data into particular data structures: XML transfers data via a commonly known and recognized encoding scheme where computers need to conduct a data-transforming step when XML data is received or sent. Thus, if an ASN.1 encoding/decoding system can become easy to use and increase the delivery schemes for optional data formats. It would greatly increase the convenience of commercial and network transmission.

The traditional ASN.1 encoding/decoding method requires modifying its encoding/decoding program every time it encounters a new ASN.1 data format. Usually, it uses a pre-processor or a program generator to meet particular requirements of a data format. The modification of the pre-processor or a program generator to accept a new data format is very time consuming and cumbersome. FIG. 1 depicts a flow diagram of a conventional method. As shown in FIG. 1, depending on ASN.1 data format, it needs modify program via a pre-processor or a program generator to satisfy a particular data format. The flows are as follows: (1). Updating data definition. (2). Executing program generator. (3). Redoing encoding or decoding. (4). Applying new function.

In the conventional method, an input of the ASN.1 data format modification program is not a text file. It is a sequence of digital serial octet data, which may contain other imbedded digital data. Thus, this data is formed as a tree structure. When a digital data contains more imbedded digital data, the depth of this tree also becomes deeper. In order to convert back to its original form, an input data must be based on its tree structure and completely expanded into a sequence of digital data, and then fed to the input of a program again.

Every node in a tree structure represents a sequence of digital data. A program for modifying ASN.1 data format uses one of pairing methods: preorder, inorder or postorder, to expand a digital data at each node. Eventually, a sequence of digital data is formed and becomes input data. When the number of nodes becomes bigger, the ASN.1 encoding/decoding system also generates more programming code and becomes more complicated.

To convert a long sequence of input data back to its original table, a conventional modified program for ASN.1 data format must look up various reference tables. It needs to find out the corresponding portion between input sequence and a reference table, then convert a long sequence data back to the original table and the contents of the original table. If the original tables are not the same, the conventional method mist modify its program to fit a particular format of ASN.1 data. A pre-processor or a program generator needs also to be modified. This is quite complicated and slow process.

Because a conventional program for ASN.1 needs to be modified, thus, data need to be encoded or decoded again and then executed with new function. This invention will overcome the drawbacks of the conventional ASN.1 encoding/decoding systems.

BRIEF SUMMARY OF THE INVENTION

This invention is to change the conventional method of using a program-generator for updating data structure format; to simplify a conventional process on formatted data; and to make the ASN.1 encoding/decoding system easy to use.

This invention provides a table look-up method for ASN.1 encoding/decoding systems. This invention includes receiving input data, adding a specified index on input data, analyzing whether input data contains explicit reference data, implicit reference data or optional data. If so, the specified index of explicit reference data, implicit reference data or optional data is modified. The modified specified index of input data is compared with a specified index in the reference table. If both are consistent, the input data is considered as fully decoded.

According to this method, input data is compared with the reference table. If the reference table contains word "explicit", then input is viewed as having the explicit reference data. Moreover, the specified index of above explicit reference data is combined with its data contents and becomes a modified data.

In above mentioned table look-up method for ASN.1 encoding/decoding systems, wherein the step of adding a specified index is to create an ASN.1 special data catalog to clearly list various data tags, various data structure types and various ASN.1 properties. All the received data is a digital serial data. The received data includes three different types: OPTIONAL, DEFAULT or ANY. The specified index is to analyze the format of input data with the corresponding reference table.

In above mentioned table look-up method for ASN.1 encoding/decoding systems, wherein the received data includes implicit reference data and the optional data. If the content of optional data is empty, this optional data will be deleted. When the input data is compared with a reference table. If the corresponding reference table contains a word "Implicit", the input data is viewed as containing implicit reference data. And the implicit reference data is compared with the reference table to obtain the data properties and convert to a modified data.

In conclusion, the process flow of the conventional encoding/decoding system is as follows: (1). Updating definition data. (2). Executing a program generator. (3). Redoing encoding or decoding. (4). Applying new function. The process flow of this invention is as follows: (1). Updating definition data. (2). Applying new functions. Thus, the method of this invention can handle formatted document without modifying its program. This method skips the executing a program generator step and the redoing encoding or decoding step. Therefore, any updates for ASN.1 data structure need only apply to a data file and no need to modify its program.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

These, as well as other features of the present invention, will become apparent upon reference to the drawings wherein.

DETAILED DESCRIPTION OF THE INVENTION

Figure 1:
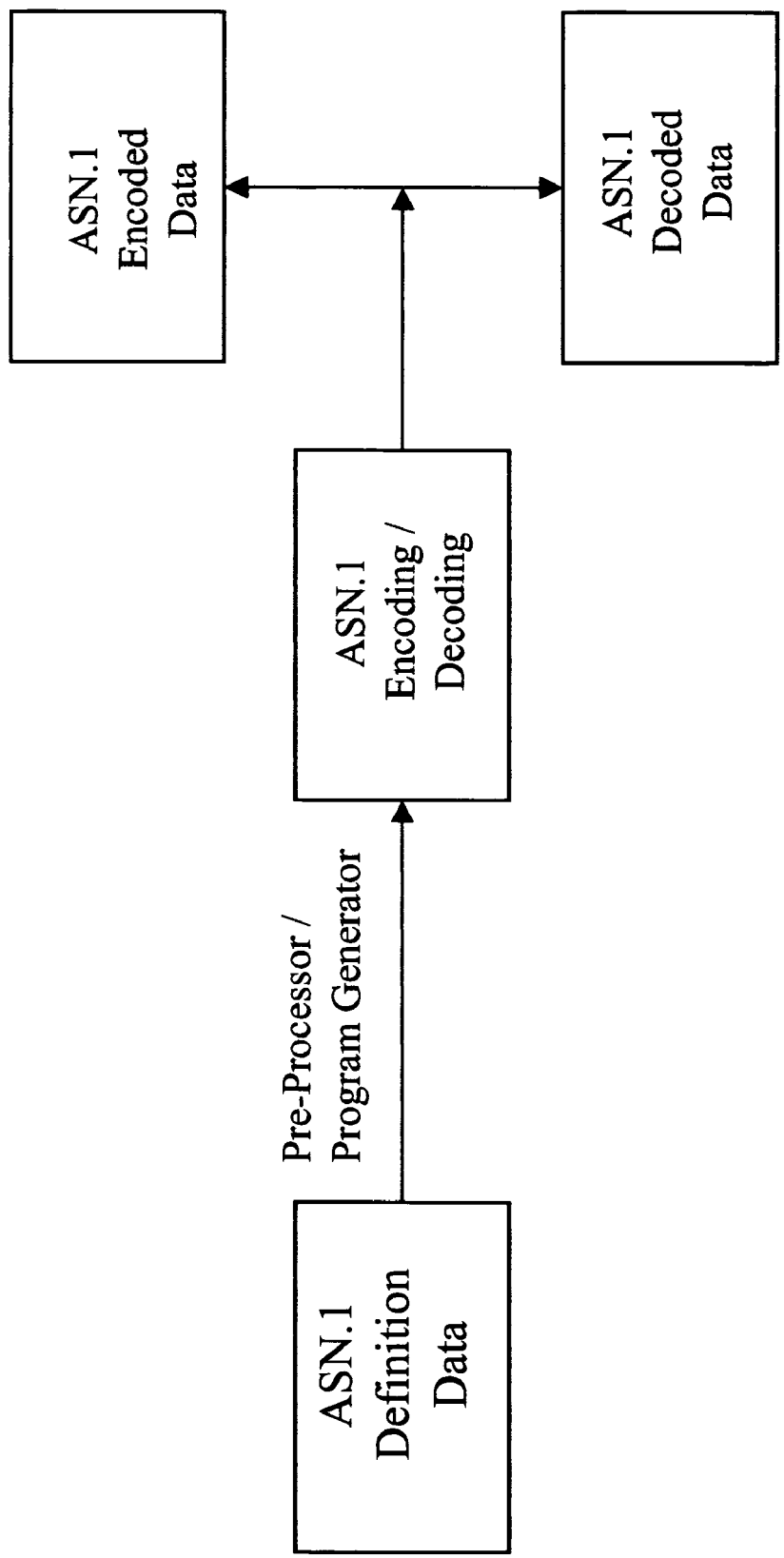
FIG. 1 depicts the flow chart for modifying format of ASN.1 data in the conventional method.
Figure 2:
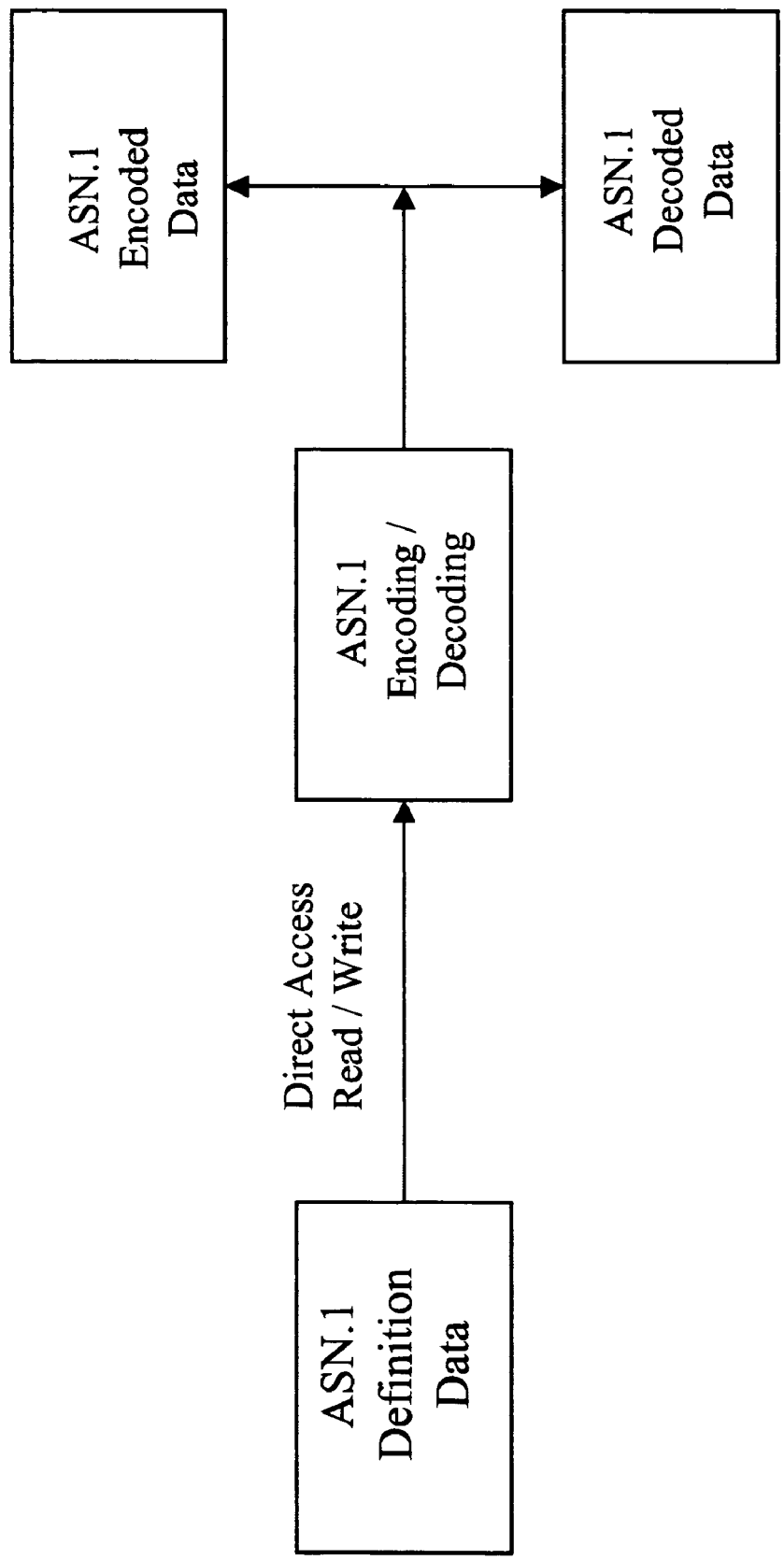
FIG. 2 depicts the structure diagram of this invention for an example applying the table look-up method for ASN.1 encoding/decoding systems.

As shown in FIG. 2, the process flow of this invention is as follows: (1). Updating definition data. (2). Applying new functions. Thus, it simplifies the conventional step of executing program generator and step of redoing encoding or decoding.

The input data definition of this invention is the same as that of the conventional method. The input data is not a text file and is a sequence of digital serial octets, which may also contain other imbedded digital data. Thus, a complete data is formed a tree structure. When a digital data has more imbedded digital data, the depth of this tree is deeper. In order to convert an input data back to its original format, it requires expanding a tree structure to a digital data as its input.

Every node in a tree structure represents a digital data. The conventional ASN.1 data format program uses one of parsing methods: preorder, inorder, or postorder, to expand data at each node level by level. Eventually, it becomes a sequence of digital data as input data.

The approach of expanding tree structure of this invention is different from the conventional method. The conventional method expands data separately at each node for each level. The method in this invention expands data at every node at the same time to become a single sequence of digital data as input data.

Furthermore, according to the definition of ASN.1, when input data contains an explicit reference, then it is an explicit data the explicit reference tag of the explicit reference data becomes a node. This invention redefines this node as a specified index. A pointer points to this specified index. Since the actual data becomes a sub-node of this node, it allows combining these two nodes to obtain the actual data, and becoming a modified node. A pointer then points to this modified node that is a specified index. On the other hand, when input data contains an implicit reference, then it is an implicit reference data the implicit reference tag of the explicit reference data becomes a node. This invention redefines this node as a specified index. A pointer points to this specified index. Since the properties of the actual data has been lost, it requires to look up the ASN.1 reference table to find out the data properties and obtain the actual data. A pointer then points to this modified node that is a specified index.

Last, when input data contains an optional data, the optional tag of the optional data and its content become a node. This invention redefines this node as a specified index. It looks up the ASN.1 reference table to find out whether the corresponding data content is "Null". If the data content is "Null", this data, i.e., this node, is removed from a tree.

This invention includes an ASN.1 data definition loader that has the following features: (1). The loader is used to create a special data catalog to clearly list various data tags. The data tags include implicit tag and/or explicit tag. The loader also lists the types of data structures which include SET/SETOF/SEQUENCE/SEQUENCE OF/INSTANCE OF/CHOICE, etc. It lists ASN.1 special properties which include OPTIONAL/DEFAULT/ANY, etc. (2). The loader can be accessed anytime by ASN.1 encoding/decoding program. (3). The ASN.1 encoding/decoding program does not need to be modified when some data structure changes are made.

Figure 3:
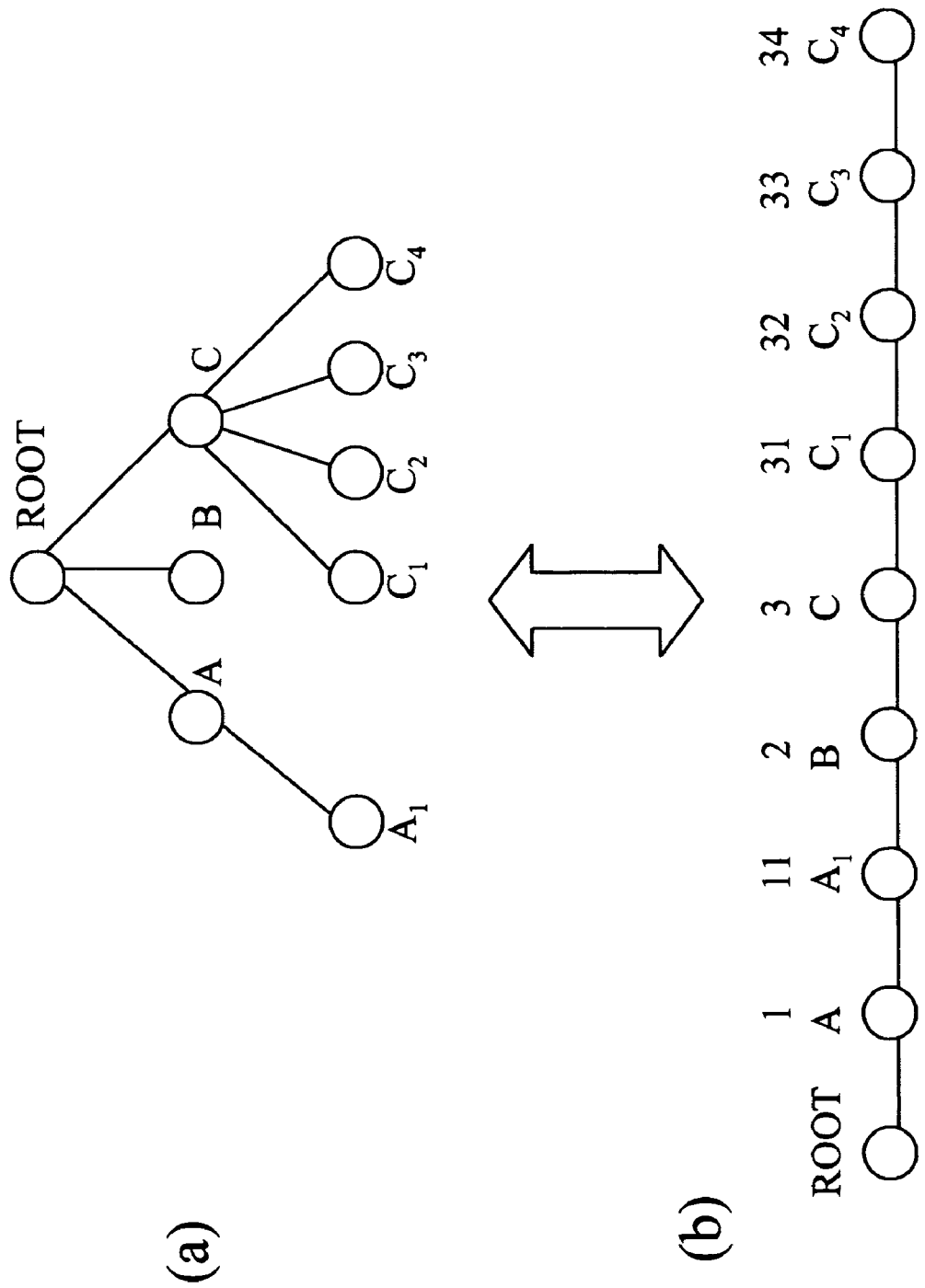
FIG. 3 depicts an example that modifies a tree structure data to a linear data as an input data in this invention.

As shown in FIG. 3(a), Root has three sub-nodes: A, B and C. Node A has sub-node $A_1$, Node C has four sub-nodes: $C_1$, $C_2$, $C_3$ and $C_4$. In this tree structure, Node C is only node that contains another tree structure of which the sub-nodes need to be visited to convert to a linear data. As shown in FIG. 3(b), its output sequence is A, A$_1$, B, C, C$_1$, C$_2$, C$_3$, and C$_4$. Where 1, 11, 2,3, 31, 32,33,34 indicate level and position of data in the tree structure.

Figure 4:
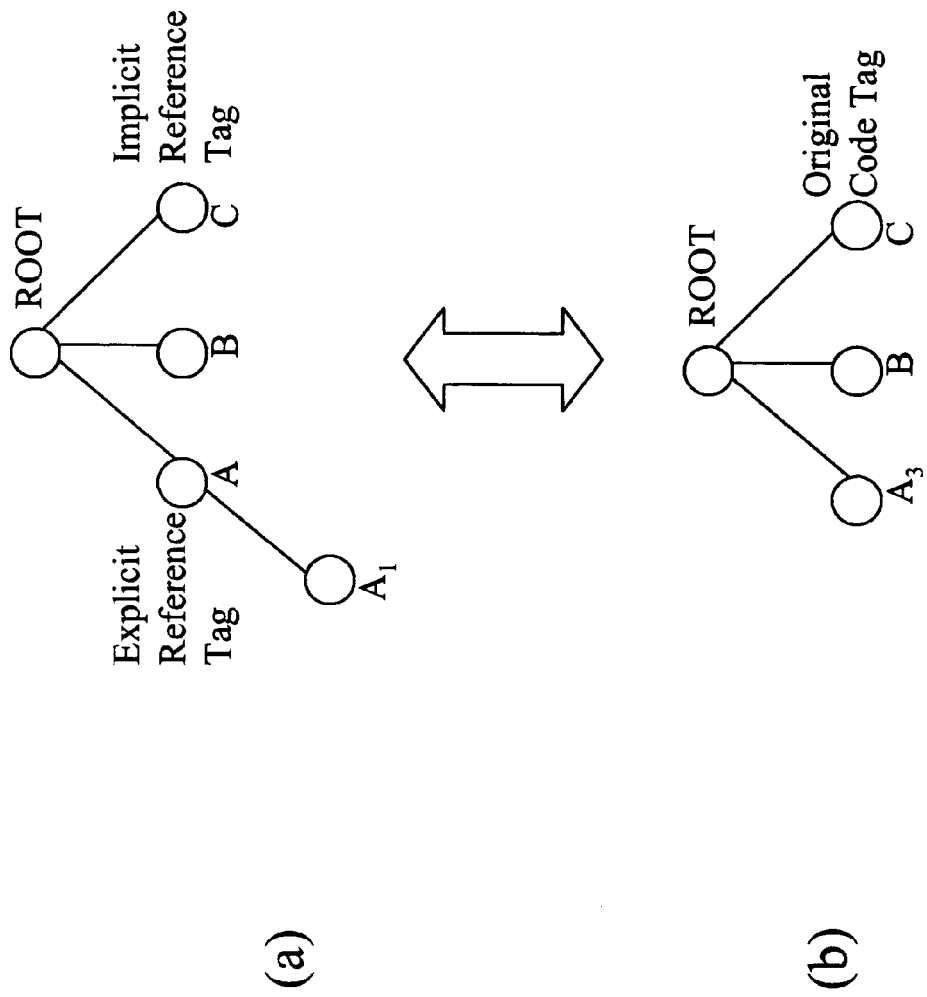
FIG. 4 illustrates an example that modifies explicit reference data and implicit reference data to become the original code tag in this invention.

As shown in FIG. 4(a), Root has three sub-nodes: A, B and C. Node A represents an explicit reference tag. Node C represents an implicit reference tag. Node A contains another sub-node A$_1$. This invention redefines Node A as a specified index that is pointed by a pointer. Since sub-node A$_1$ contains the actual data, thus this invention combines these two nodes into Node A$_3$ to obtain the actual data and then moves the pointer to Node A$_3$. This invention redefines Node C as another specified index that is pointed by a pointer. Since the properties of the actual data has been lost, this invention first looks up the ASN.1 reference table to find out the properties and obtain the actual data. It then moves the pointer to Node C that now contains the actual data. This is the only modified tree structure and is converted to the original code tag. FIG. 4(b) depicts the modified tree structure.

Figure 5:
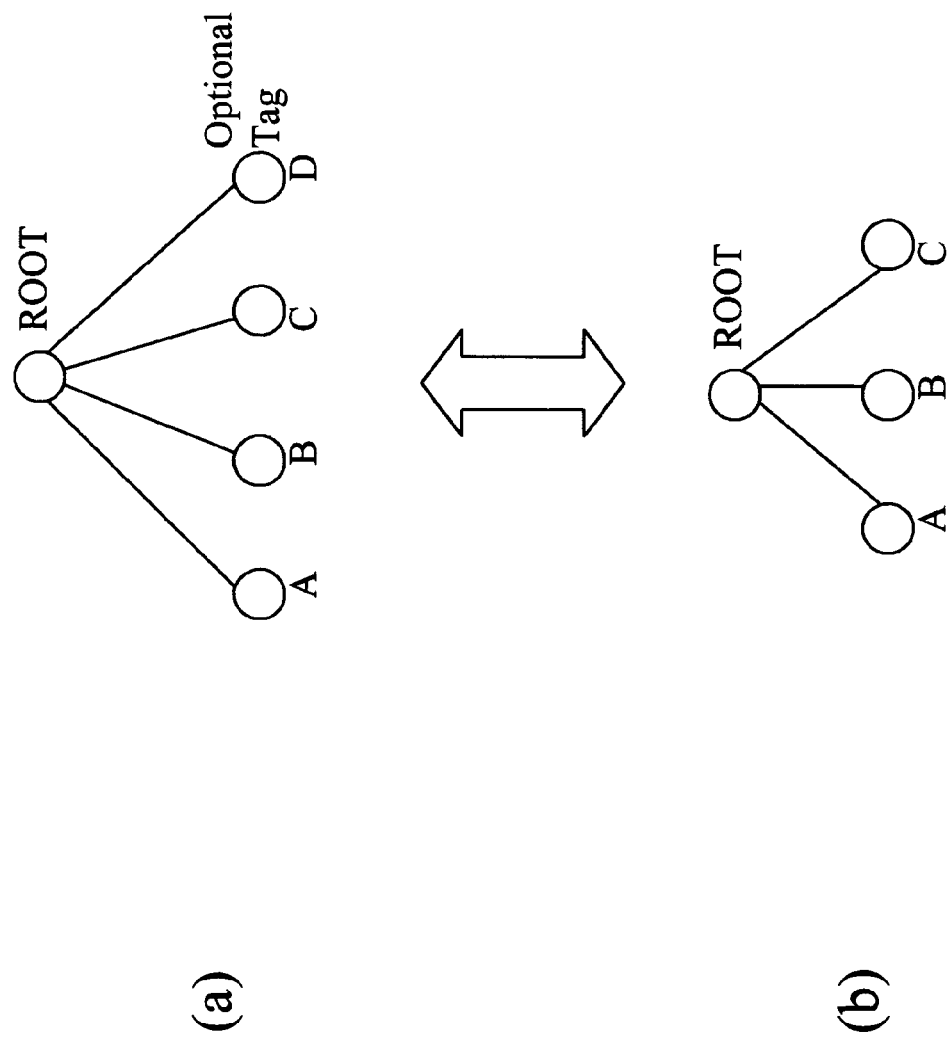
FIG. 5 illustrates an example that modifies optional data in this invention.

As shown in FIG. 5(a), Root has four sub-nodes: A, B, C, and D. Node D represents an optional data. When input data contains an optional data, Node D comprises both the optional data tag and the content as well. This invention redefines this node as a specified index, and looks up the ASN.1 reference table to verify whether the content of data D is "Null". If the content of data D is "Null", this invention deletes this node. FIG. 5(b) depicts the modified tree structure after Node D is deleted.

EXAMPLE

For an original C program is as follows.

```
/*
This is the ASN.1 syntax table:
ValidTimePeriod ::= SEQUENCE {
    notBefore UTCTime,
    notAfter UTCTime
}
*/
typedef struct VALID_TIME_PERIOD_st {
    ASN1_UTCTIME    *notBefore;
    ASN1_UTCTIME    *notAfter;
} VALID_TIME_PERIOD;
int fnDecodeValidTime(
    ASN1_DATA              *pInData,
    VALID_TIME_PERIOD      *pValidTimePeriodSt
){
    ASN1_Ctx   *pCtx;
    pCtx = ASN1_Decode_Sequence(pInData);
    if (!pCtx) return false;
    ASN1_Decode_UTCTime(pCtx, &(pValidTimePeriodSt->notBefore));
    ASN1_Decode_UTCTime(pCtx, &(pValidTimePeriodSt->notAfter));
    return TRUE;
}
```

After ASN.1 Table is modified, according to the conventional method, the program need to be rewritten as follows.

```
/*
This is the ASN.1 syntax table:
ValidTimePeriod ::= SEQUENCE {
notBefore          Time,
    notAfter       Time }
Time ::= CHOICE {
    utcTime            UTCTime,
    generalizedTime    GeneralizedTime}
*/
typedef struct VALID_TIME_PERIOD_st {
        ASN1_TIME   *notBefore;
        ASN1_TIME   *notAfter;
} VALID_TIME_PERIOD;
typedef struct TIME_CHOICE_st {
        ASN1_UTCTIME              *utcTime;
        ASN1_GENERALIZEDTIME      *genTime;
} TIME_CHOICE;
int fnDecodeValidTime(
        VALID_TIME_PERIOD   *pInData,
        TIME_CHOICE         *pTimeChoiceSt
){
        ASN1_Ctx   *pCtx;
        pCtx = ASN1_Decode_Choice(pInData);
        if (!pCtx) return false;
        ASN1_Decode_UTCTime(pCtx, &(pTimeChoiceSt->utcTime));
        ASN1_Decode_GENERALIZEDTime(pCtx, &(pTimeChoiceSt->genTime));
        return TRUE;
}
int fnDecodeValidTime(
        ASN1_DATA           *pInData,
        VALID_TIME_PERIOD   *pValidTimePeriodSt
){
        ASN1_Ctx   *pCtx;
        pCtx = ASN1_Decode_Sequence(pInData);
        if (!pCtx) return false;
        ASN1_Decode_Time(pCtx, &(pValidTimePeriodSt->notBefore));
        ASN1_Decode_Time(pCtx, &(pValidTimePeriodSt->notAfter));
        return TRUE;
}
```

The conventional expansion of TLV (Tag, Length, Value) is as follows.

```
T1-L1(T2-L2-V2-T3-L3-(T4-L4-V4-T5-L5-V5))
->
T1-L1{
    T2-L2-V2
    T3-L3(T4-L4-V4-T5-L5-V5)
}
->
T1-L1{
    T2-L2-V2
    T3-L3 {
        T4-L4-V4
        T5-L5-V5
    }
}
```

However, the present invention is expanded as follows.

```
T1-L1(T2-L2-V2-T3-L3-(T4-L4-V4-T5-L5-V5))
->
(indexed 1)      T1-L1(T2-L2-V2-T3-L3-(T4-L4-V4-T5-L5-V5))
(indexed 1.1)    T2-L2-V2
(indexed 1.2)    T3-L3-(T4-L4-V4-T5-L5-V5)
(indexed 1.2.1)  T4-L4-V4
(indexed 1.2.2)  T5-L5-V5
```

Therefore the program of the present invention is as follows.

```
) {
    ASN1_Ctx        *pCtx = 0;
    ASN1_Table      *pTable = ASN1_Init_Table(FILE_NAME);
    pCtx = ASN1_Decode(pInData, "ValidTime", pTable);
    if (!pCtx) return false;
    ASN1_Get_Decode_Data(pCtx, &pNotBefore, "notBefore", DATA_TYPE_TIME_T);
    ASN1_Get_Decode_Data(pCtx, &pNotAfter, "notAfter", DATA_TYPE_TIME_T);
    return TRUE;
}
```

This disclosure provides exemplary embodiments of the present invention. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A table look-up method for parsing data in an Abstract Syntax Notation encoding/decoding systems comprises the steps of:
   a. receiving input data;
   b. adding a first specified index on the received input data;
   c. analyzing whether the received data contain explicit reference data, implicit reference data or optional data;
   d. storing the received data based on its structure format accordingly; modifying and storing the first specified index of the received data;
   e. comparing the modified first specified index with plurality of existing second specified indexes in a index in the reference table; and
   f. if a match is found, the data is viewed as fully decoded.

2. The method as claimed in claim 1, wherein the step (c) further comprising comparing input data with a reference table, where if the reference table contains word "Explicit", the input data is viewed as having explicit reference data.

3. The method as claimed in claim 1, wherein the step (d) further comprises modifying the specified index of explicit reference data by combining the specified index and its content.

4. The method as claimed in claim 1, wherein the step (c) further comprising comparing input data with a reference table further comprising if the reference table contains word "Implicit", the input data is viewed as having implicit reference data.

5. The method as claimed in claim 1, wherein the step (d) further comparing the implicit reference data with the reference table to obtain data properties and to become the modified data.

6. The method as claimed in claim 1, wherein the step (d) further comprising deleting the optional data if its content is "Null".

7. The method as claimed in claim 1, wherein the step (b) further comprising adding a specified index is a ASN.1 special data catalog for clearly listing various data tags, data structure types and various ASN properties.

8. The method as claimed in claim 1, wherein the received data is a digital serial data.

9. The method as claimed in claim 1, wherein the received data also includes the following three types: OPTIONAL/DEFAULT/ANY.

10. The method as claimed in claim 1, wherein the specified index is used for identifying the format of received data from a corresponding reference table.

* * * * *